United States Patent
Fauceglia et al.

(10) Patent No.: US 10,643,120 B2
(45) Date of Patent: May 5, 2020

(54) JOINT LEARNING OF LOCAL AND GLOBAL FEATURES FOR ENTITY LINKING VIA NEURAL NETWORKS

(71) Applicant: International Business Machines Corporation, Armonk, NY (US)

(72) Inventors: Nicolas R. Fauceglia, Buenos Aires (AR); Alfio M. Gliozzo, Brooklyn, NY (US); Oktie Hassanzadeh, Port Chester, NY (US); Thien H. Nguyen, Brookly, NY (US); Mariano Rodriguez Muro, New York, NY (US); Mohammad Sadoghi Hamedani, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 15/351,897

(22) Filed: Nov. 15, 2016

(65) Prior Publication Data

US 2018/0137404 A1    May 17, 2018

(51) Int. Cl.
*G06N 3/04* (2006.01)
*G06N 3/08* (2006.01)

(52) U.S. Cl.
CPC ......... *G06N 3/0454* (2013.01); *G06N 3/0445* (2013.01); *G06N 3/084* (2013.01)

(58) Field of Classification Search
CPC ..... G06N 3/0454; G06N 3/0445; G06N 3/084
See application file for complete search history.

(56) References Cited

U.S. PATENT DOCUMENTS

| 4,912,648 A * | 3/1990 | Tyler .................. G06N 5/04 706/52 |
| 9,633,002 B1 * | 4/2017 | Balluru ................ G06F 17/278 |
| 2009/0049033 A1 * | 2/2009 | Sedov ................. G06F 16/9535 |
| 2011/0208709 A1 | 8/2011 | Holthausen |
| 2012/0078612 A1 * | 3/2012 | Kandekar ........... G06F 17/2745 704/9 |
| 2015/0363688 A1 | 12/2015 | Gao et al. |

(Continued)

OTHER PUBLICATIONS

Sun et al., Modeling Mention, Context and Entity with Neural Networks for Entity Disambiguation, 2015, 7 pages (Year: 2015).*

(Continued)

*Primary Examiner* — Vincent Gonzales
*Assistant Examiner* — Tri T Nguyen
(74) *Attorney, Agent, or Firm* — Scully, Scott, Murphy & Presser, P.C.; Anthony Curro, Esq.

(57) ABSTRACT

A system, method and computer program product for disambiguating one or more entity mentions in one or more documents. The method facilitates the simultaneous linking entity mentions in a document based on convolution neural networks and recurrent neural networks that model both the local and global features for entity linking. The framework uses the capacity of convolution neural networks to induce the underlying representations for local contexts and the advantage of recurrent neural networks to adaptively compress variable length sequences of predictions for global constraints. The RNN functions to accumulate information about the previous entity mentions and/or target entities, and provide them as the global constraints for the linking process of a current entity mention.

16 Claims, 5 Drawing Sheets

(56) References Cited

U.S. PATENT DOCUMENTS

| | | | |
|---|---|---|---|
| 2016/0155050 A1 | 6/2016 | Buibas et al. | |
| 2017/0109355 A1* | 4/2017 | Li | G06N 7/005 |
| 2017/0169493 A1* | 6/2017 | Florance | G06Q 30/0625 |

OTHER PUBLICATIONS

IBM, "Cellular Neuronal Network Grids—a scientific solution with Grid computing", IP.com Prior Art Database Technical Disclosure, Jul. 15, 2004, IPCOM000029871D.

Clemm et al., "Network Analytics Task Interactions Framework", IP.com Prior Art Database Technical Disclosure, Feb. 20, 2015, IPCOM000240718D.

Anonymous, "Machine Learning Algorithms for Smart Meter Diagnostics", IP.com Prior Art Database Technical Disclosure, Jul. 16, 2015, IPCOM000242462D.

Francis-Landau et al., "Capturing Semantic Similarity for Entity Linking with Convolutional Neural Networks", Proceedings of NAACL-HLT 2016, pp. 1256-1261, San Diego, CA, Jun. 12-17, 2016, Association for Computational Linguistics.

Alhelbawy et al., "Graph Ranking for Collective Named Entity Disambiguation", Proceedings of the 52nd Annual Meeting of the Association for Computational Linguistics (Short Papers), pp. 75-80, Baltimore, MD, Jun. 23-25, 2014, Association for Computational Linguistics.

Sun et al., "Modeling Mention, Context and Entity with Neural Networks for Entity Disambiguation", IJACI'15, Proceedings of teh 24th International Conference on Artificial Intelligence, pp. 1333-1339, Buenos Aires, Argentina, Jul. 25-31, 2015.

Ratinov et al., "Local and Global Algorithms for Disambiguation to Wikipedia", Proceedings of teh 49th Annual Meeting of teh Association for Computational Linguistics, pp. 1375-1384, Portland, Oregon, Jun. 19-24, 2011, Association for Computational Linguistics.

Hoffart et al., "Robust Disambiguation of Named Entities in Text", Proceedings of the 2011 Conference on Empirical Methods in Natural Language Processing, pp. 782-792, Edinburgh, Scotland, UK, Jul. 27-31, 2011, Association for Computational Linguistics.

Durrett et al., "A Joint Model for Entity Analysis: Coreference, Typing, and Linking", Transactions of the Association for Computational Linguistics, vol. 2, pp. 477-490, Nov. 1, 2014, Association for Computational Linguistics.

Cucerzan, "Large-Scale Named Entity Disambiguation Based on Wikipedia Data", Proceedings of the 2007 Joint Conference on Empirical Methods in Natural Language Processing and Computational Natural Language Learning, pp. 708-716, Prague, Jun. 2007, Association for Computational Linguistics.

Han et al., "Collective Entity Linking in Web Text: A Graph-Cased Method", SIGIR'11, Jul. 24-28, 2011, Beijing, China, pp. 765-774.

Nguyen et al., "Toward Mention Detection Robustness with Recurrent Neural Networks", Computer Science Departmetn, New York University, New York, NY, USA, IBM T.J. Watson Research Center, Yorktown Heights, N.Y., USA, Feb. 2016.

* cited by examiner

JOINT LEARNING OF LOCAL AND GLOBAL FEATURES FOR ENTITY LINKING VIA NEURAL NETWORKS

FIELD

The present disclosure relates generally to machine learning and machine reasoning, and more particularly to a system framework based on convolution neural networks and recurrent neural networks to simultaneously model local and global features for entity linking (EL).

BACKGROUND

An early approach for the ranking problem in EL has resolved the entity mentions in documents independently (the local approach), utilizing various discrete and hand-designed features/heuristics to measure the local mention-to-entity relatedness for ranking. These features are often specific to each entity mention and candidate entity, covering a wide range of linguistic and/or structured representations such as lexical and part-of-speech tags of context words, dependency paths, topical features, KB (Knowledge Base) infoboxes. Although the local approach can exploit a rich set of discrete structures for EL, its limitation is twofold:

(i) The independent ranking mechanism in the local approach overlooks the topical coherence among the target entities referred by the entity mentions within the same document. This is undesirable as the topical coherence has been shown to be effective for EL.

(ii) The local approach might suffer from the data sparseness issue of unseen words/features, the difficulty of calibrating, and the failure to induce the underlying similarity structures at high levels of abstraction for EL due to the extensive reliance on the hand-designed coarse features.

The first drawback of the local approach has been overcome by the global models in which all entity mentions (or a group of entity mentions) within a document are disambiguated simultaneously to obtain a coherent set of target entities. The central idea is that the referent entities of some mentions in a document might in turn introduce useful information to link other mentions in that document due to the semantic relatedness among them. For example, the appearances of "Manchester" and "Chelsea" as the football clubs in a document would make it more likely that the entity mention "Liverpool" in the same document is also a football club. Unfortunately, the coherent assumption of the global approach does not hold in some situations, necessitating the discrete features in the local approach as a mechanism to reduce the potential noise. Consequently, the global approach is still subject to the second limitation of data sparseness of the local approach due to their use of discrete features.

Recently, the surge of neural network (NN) models has presented an effective mechanism to mitigate the second limitation of the local approach. In such models, words are represented by the continuous representations and features for the entity mentions and candidate entities are automatically learnt from data. This essentially alleviates the data spareness problem of unseen words/features and extracting more effective features for EL in a given dataset.

In practice, the features automatically induced by NN are combined with the discrete features in the local approach to extend their coverage for EL. However, as the previous NN models for EL are local, they cannot capture the global interdependence among the target entities in the same document.

SUMMARY

According to a first aspect, there is provided a use of neural networks to model both the local mention-to-entity similarities and the global relatedness among target entities in a unified architecture.

According to an aspect of the present disclosure, there is provided a computer-implemented method for disambiguating one or more entity mentions in one or more documents. The method comprises: receiving, at at least one processor, a set of one or more entity mentions in a document and context data associated with each entity mention; receiving, at the at least one processor, a set of one or more target candidate entities that potentially refers to or describes the entity mentions in the document; running, by the at least one processor, convolutional neural network (CNN) models for identifying and learning local representations associated with each entity mention and target candidate entity and associated context; running recurrent neural networks (RNN) model operations on the at least one processor over the representations of the entity mentions and target candidate entities of the document to capture a topical coherence between the entity mentions and the target candidate entities; and providing a link for each entity mention to link to a respective the target candidates entity in the document based on the identified local features and the topical coherence from the convolutional neural networks and recurrent neural networks.

According to another aspect of the present disclosure, there is provided a computer system for disambiguating one or more entity mentions in one or more documents. The computer system comprises: at least one processor; a memory storing instructions to be run at the at least one processor; the instructions configuring the at least one processor to perform a method to: receive a set of one or more entity mentions in a document and context data associated with each entity mention; receive a set of one or more target candidate entities that potentially refers to or describes the entity mentions in the document; run convolutional neural network (CNN) models for identifying and learning local representations associated with each entity mention and target candidate entity and associated context; run recurrent neural networks (RNN) model operations over the representations of the entity mentions and target candidate entities of the document to capture a topical coherence between the entity mentions and the target candidate entities; and provide a link for each entity mention to link to a respective the target candidates entity in the document based on the identified local features and the topical coherence from the convolutional neural networks and recurrent neural networks.

According to another aspect a computer program product for disambiguating one or more entity mentions in one or more documents is provided. The computer program product comprises a computer readable storage medium having program instructions embodied therewith. The program instructions are executable by at least one processor to cause a computer to perform a computer-implemented method. The method includes receiving, at at least one processor, a set of one or more entity mentions in a document and context data associated with each entity mention; receiving, at the at least one processor, a set of one or more target candidate entities that potentially refers to or describes the entity mentions in the document; running, by the at least one processor, convolutional neural network (CNN) models for identifying and learning local representations associated with each entity mention and target candidate entity and associated context; running recurrent neural networks (RNN) model operations on the at least one processor over the representations of the entity mentions and target candidate entities of the document to capture a topical coherence between the entity mentions and the target candidate entities; and providing a link for each entity mention to link to a respective the target candidates entity in the document based on the identified local features and the topical coherence from the convolutional neural networks and recurrent neural networks

BRIEF DESCRIPTION OF THE SEVERAL VIEWS OF THE DRAWINGS

Embodiments will be described in more detail below, by way of illustrative and non-limiting examples, with reference to the accompanying drawings.

DETAILED DESCRIPTION

A system and method to address the problem of entity linking (EL): mapping entities mentioned in documents to their correct entries (called target entities) in some existing knowledge bases (KB), e.g., Wikipedia. For instance, in the sentence "Liverpool suffered an upset first home league defeat of the season", an entity linking system should be able to identify the entity mention "Liverpool" as a football club rather than a city in England in the knowledge bases. This is a challenging problem of natural language processing, as the same entity might be presented in various names, and the same entity mention string might refer to different entities in different contexts.

Entity linking is a fundamental task for other applications such as information extraction, knowledge base construction etc. In order to tackle with the ambiguity in EL, previous studies have first generated a set of target entities in the knowledge bases as the referent candidates for each entity mention in the documents, and then solved a ranking problem to disambiguate the entity mention. One challenge in this paradigm is the ranking model that computes the relevance of each target entity candidates to the corresponding entity mention using the available context information in both the documents and the knowledge bases.

In one embodiment, there is provided a novel framework based on convolutional neural networks and recurrent neural networks to simultaneously model the local and global features for entity linking. The proposed model benefits from the capacity of convolutional neural networks to induce the underlying representations for local contexts and the advantage of recurrent neural networks to adaptively compress variable length sequences of predictions for global constraints.

Figure 1:
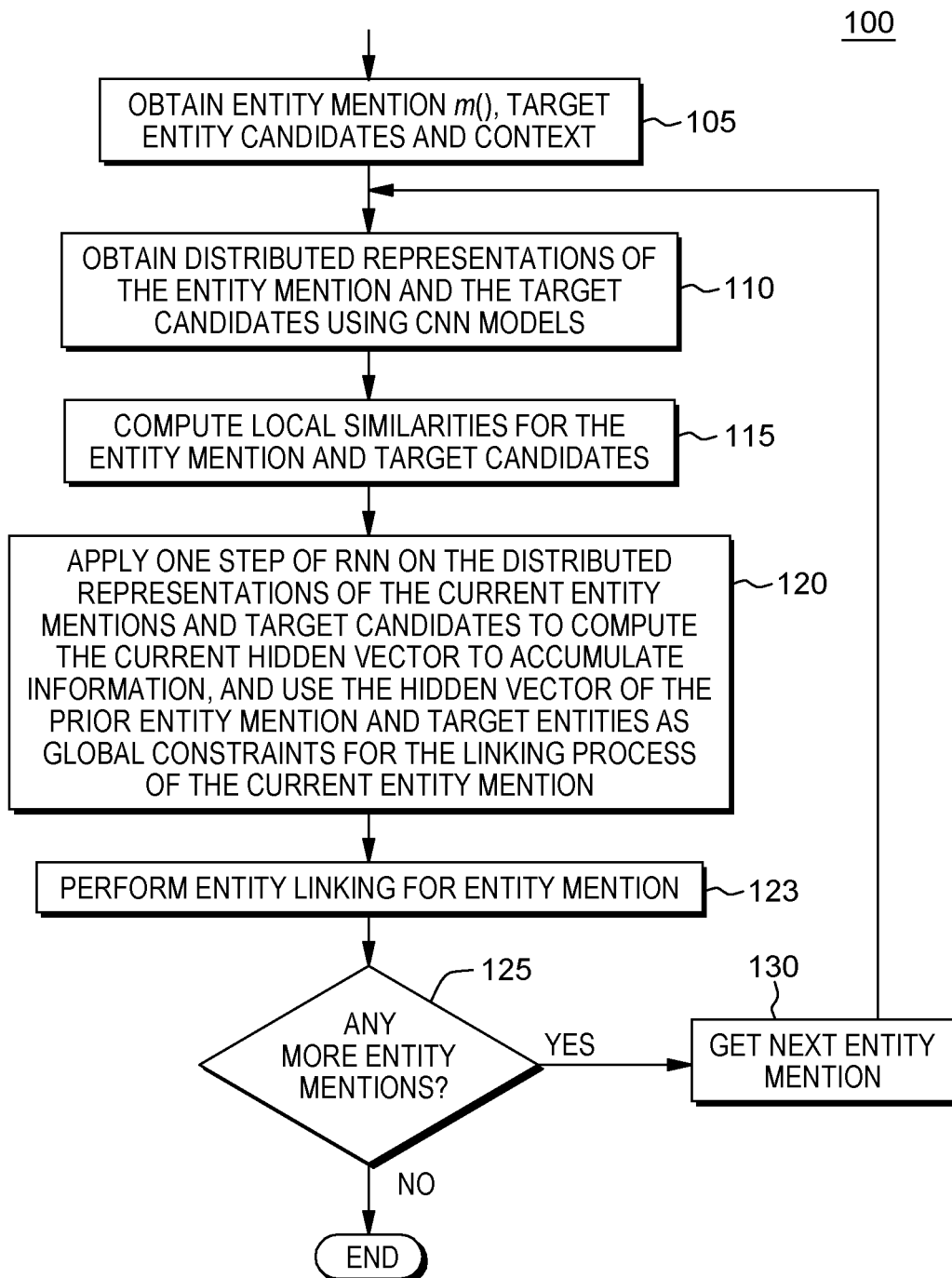
FIG. 1 depicts a method for processing the entity mention and context word sequence inputs for entity linking application using CNN and RNN models in one embodiment.
Figure 3:
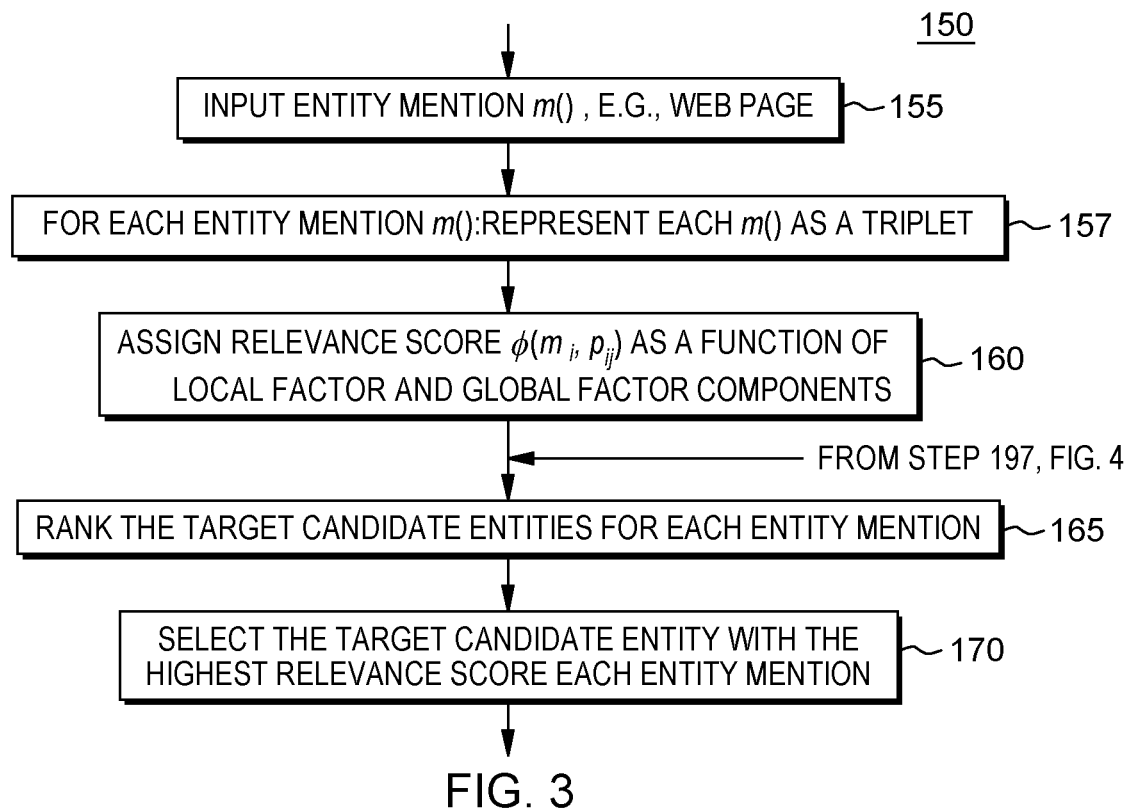
FIG. 3 depicts a method for processing the entity mention and context word sequence inputs for entity linking application using the CNN and RNN models in one embodiment.
Figure 4:
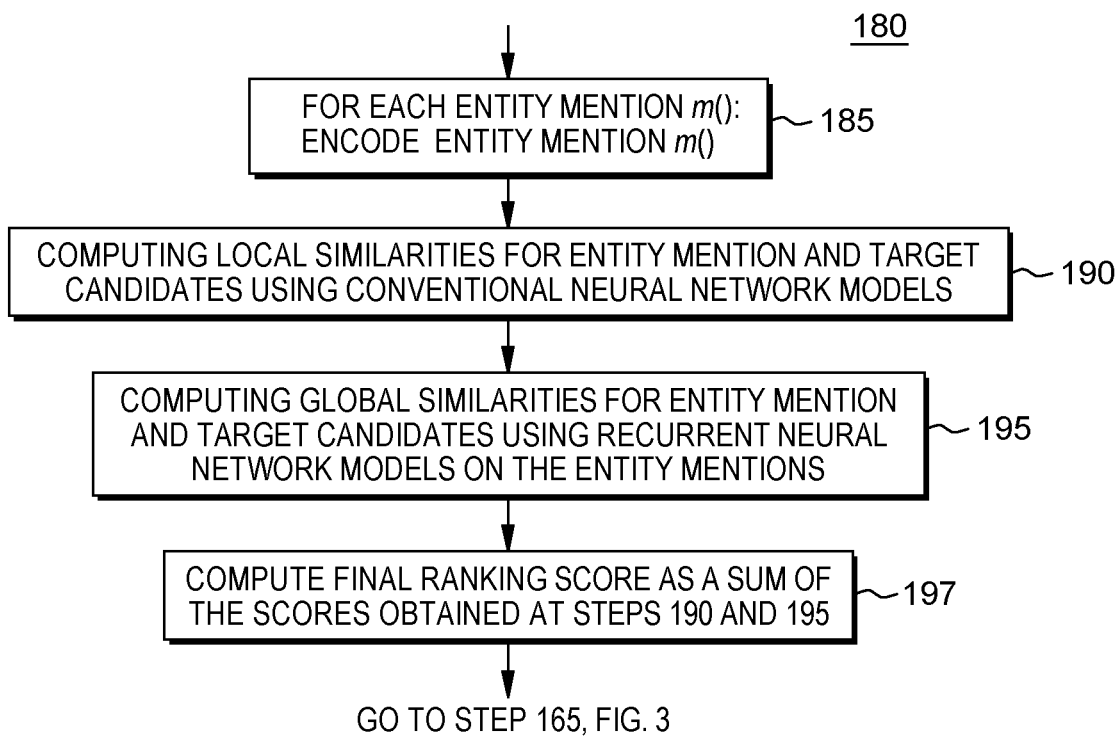
FIG. 4 shows a more detailed method performed at step 160, FIG. 3 to assign the relevance score as a function of local factor and global factor components in one embodiment.

FIG. 1 shows an overall method implemented in a computing system configured to simultaneously perform linking for every entity mention in a document, e.g., web page, from the beginning to the end of the document. The simultaneous linking for the entity mentions in a document can be seen as an iterative process over the entity mentions. At 105, there is obtained an entity mention from the document, e.g., obtained starting from the beginning of the document. For the entity mention, at 110, FIG. 1, the computing system utilizes a convolutional neural network model (CNN) to obtain the distributed representations for the entity mention as well as its target candidates. That is, the CNNs are employed to identify and learn local features associated with the entity mentions and one or more target candidates. In one embodiment, multiple window sizes are applied to parameterize convolution operation. These distributed representations are then used for two purposes: (i) for computing the local similarities for the entity mention and target candidates at 115, and (ii) functioning as the input for the recurrent neural networks (RNN). In particular, at 120, the RNN is invoked to run over the entity mentions in the documents, accumulate information about the previous entity mentions and target entities, and provide these as the global constraints for the linking process of the current entity mention. After the RNNs are used to identify a topical coherence between the entity mentions and the target candidates, then, at 123, the method performs the entity linking based on the results of the CNN and RNN runs. That is, at 123, the method performs linking the entity mentions to the target entities, based on the local representations and the topical coherence. FIGS. 3 and 4 show further details of the entity linking process that includes: computing the relevance scores for each target candidates based on local similarities and global coherence and rank the target candidates based on these relevance scores. Then, as shown in FIG. 1, at 125, a determination is made as to whether all entity mentions have been processed. If all entity mentions have been processed for input to the CNN and RNN-based entity linking framework, then the process ends. Otherwise, at 125, if it is determined that there are other entity mentions that have not been processed, the process continues to step 130 to get the next entity mention and the process returns to step 110 to repeat steps 110-125, until there are no longer any entity mentions to process for the document.

Figure 2:
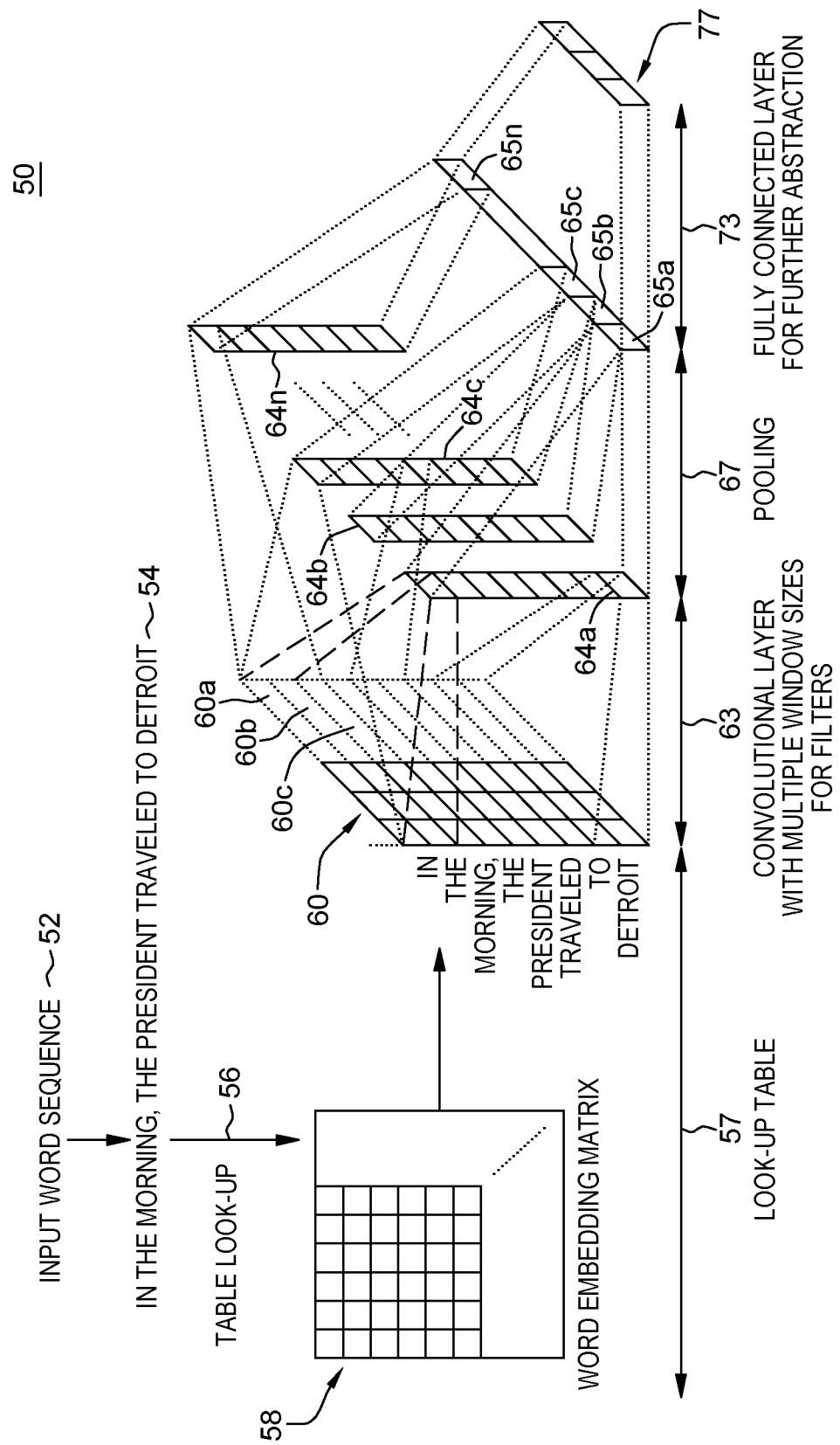
FIG. 2 depicts an overview of the convulation neural network (CNN) model used to encode word sequences as implemented at step 110, FIG. 1, in one embodiment.

FIG. 2 shows an overview of the convolution neural network (CNN) model 50 implemented at step 110, FIG. 1, according to embodiments herein. As shown in FIG. 2, a sequence of words (e.g., extracted from a document such as a web page) including an entity mention and surrounding word context is input to a computer system as a word sequence 52. In the model depicted in FIG. 1, an example sequence of words being input is In the morning, the president traveled to Detroit 54. Then, at 56, the input word sequence 54 is converted into a matrix 60. In one embodiment, the generated matrix 60 is formed using table look-up operations 57 to embed words for obtaining fixed length vectors using a look-up table 58. Look-up table 58 provides a mapping between each word of the input sequence to a corresponding vector 60a, 60b, 60c, etc. of the matrix 60. Thus, the sequence of input words 52 are converted to a series of fixed length vectors 60a, 60b, 60c, etc. to be input the CNN model. Then, convolution neural network layer operations 63 of the CNN model are performed on vectors vector 60a, 60b, 60c, etc. with multiple window sizes for filters to generate hidden column vector representations 64a, 64b, . . . , 64n. Each window corresponds to a window of words surrounding an entity mention in the document.

As further shown in FIG. 2, pooling operations 67 are then performed to generate a score or value for each vector representation 64a, 64b, . . . , 64n. In one embodiment, pooling operations include applying a sum function to map each vector 64a, 64b, . . . , 64n to a corresponding respective score (value) 65a, 65b, . . . , 65n. Then, operations 73 are performed to obtain a further abstraction which includes applying a further function to generate a single representative (concatenation) vector 77 for the input word sequence 52.

As now shown in FIG. 3, there is depicted a method 150 for processing the entity mention and context word sequence inputs for entity linking application using the CNN and RNN models. In FIG. 3, at 155, the computing system receives inputs defining the entity linking problem as follows: Let D be the input document and M={$m_1, m_2, \ldots, m_k$} be the entity mentions in D. In one embodiment, the method performs mapping each entity mention $m_i$ to its corresponding entity database page, e.g., a Wikipedia page (entity), or otherwise returning a "NIL" if $m_i$ is not present in Wikipedia. For each entity mention $m_i \in D$, let $P_i = \{p_{i1}, p_{i2}, \ldots p_{in_i}\}$ be its set of Wikipedia candidate pages (entities) where $n_i$ is the number of page candidates for $m_i$. Also, let $p_i^* \in P_i$ be the correct target entity for $m_i$. In one embodiment, at 155, the method executes a query generation for each entity mention, whose outputs are combined with link counts to retrieve the potential entities (including "NIL"). The query generation itself involves removing stop words, plural suffixes, punctuation, and leading or tailing words.

At 157, the method represents each entity mention $m_i$ by the triple $m_i = (s_i, c_i, d_i)$, where $s_i$ is the surface string of $m_i$, $c_i$ is the immediate context (within some predefined window) of $m_i$ and $d_i$ is the entire document containing $m_i$. Essentially, $s_i$, $c_i$ and $d_i$ are the sequences of words to capture the contexts or topics of $m_i$ at multiple granularities. For the target candidate pages $p_{ij}$, there is used the title $t_{ij}$ and body content $b_{ij}$ to represent them ($p_{ij} = (t_{ij}, b_{ij})$). For convenience, there is a quantity $p_i^* = (t_i^*, b_i^*)$ denoted for the correct entity pages. In one embodiment, $t_{ij}$, $b_{ij}$, $t_i^*$ and $b_i^*$ are sequences of words.

In one example implementation, regarding the input contexts for the entity mentions and the target candidates, there may be utilized a window size of 10 for the immediate context $c_i$, with the methods extracting only the first 100 words in the documents for $d_i$ and $b_{ij}$.

In order to link the entity mentions, at 160, FIG. 3, the method first performs assigning a relevance score (function) $\phi(m_i, p_{ij})$ for each target candidate $p_{ij}$ of $m_i$, and then use these scores to rank the candidates for each mention at 165.

Then, at 170 the method performs the linking of each entity mention to a target candidate. In one embodiment, at 170, FIG. 3, the method performs linking the entity mentions to the target entities, based on the local features (CNN produced) and the topical coherence (RNN produced). Thus, in one embodiment, for each entity mention, there is obtained a list of target candidates (entities). In one embodiment, the method selects a target candidate from the target candidate list so that this selected target candidate (i.e., the correct target entity) is the entity referred by the entity mention. The choosing a target candidate is the linking of the entity mention to the target entity at 170. In the selection, there is further computed a ranking score (e.g., a number value) for each candidate in the candidate list so that the score for the correct target entity is the highest. In one embodiment, the score is computed for each candidate entity based on the local representations and the topical coherence, meaning that the scores have two factors: (i) the similarity of the candidate and the entity mention based on the local representation vectors from CNN, and (ii) the similarity of the candidate and the summarization of the correct target entities appearing previously (which corresponds to the topical coherence and is implemented via the RNN).

FIG. 4 shows a more detailed method 180 performed at 160, FIG. 3 to assign the relevance score as a function of local factor and global factor components. In one aspect, the method decomposes the relevance score function $\phi(m_i, p_{ij})$ as the sum of the two following factors $\phi_{local}$, $\phi_{global}$ to wit:

$$\phi(m_i, p_{ij}) = \phi_{local}(m_i, p_{ij}) + \phi_{global}(m_1, m_2, \ldots, m_i, P_1, P_2, \ldots, P_i)$$

where function $\phi_{local}(m_i, p_{ij})$ represents the local similarities between $m_i$ and $p_{ij}$, i.e, only using the information related to $m_i$ and $p_{ij}$; and the function $\phi_{global}(m_1, m_2, \ldots, m_i, P_1, P_2, \ldots, P_i)$ additionally considers the other entity mentions and candidates in the document, attempting to model the interdependence among these objects.

The denotation $\phi_{global}(m_1, m_2, \ldots, m_i, P_1, P_2, \ldots, P_i)$ implies the computing of the ranking scores for all the target candidates of all the entity mentions in each document simultaneously, preserving the order of the entity mentions from the beginning to the end of the input document. Particularly, FIG. 3 shows steps for a single entity mention in the iterative process (of FIG. 1) over all entity mentions of a document, and these steps are connected by applying the RNN. Thus, the computing of ranking scores "simultaneously" at 165, FIG. 3, refers to the linking of all entity mentions in a document in a single iterative process. The role of RNNs is to accumulate and transform information from the prior steps to the current step.

Figure 6:
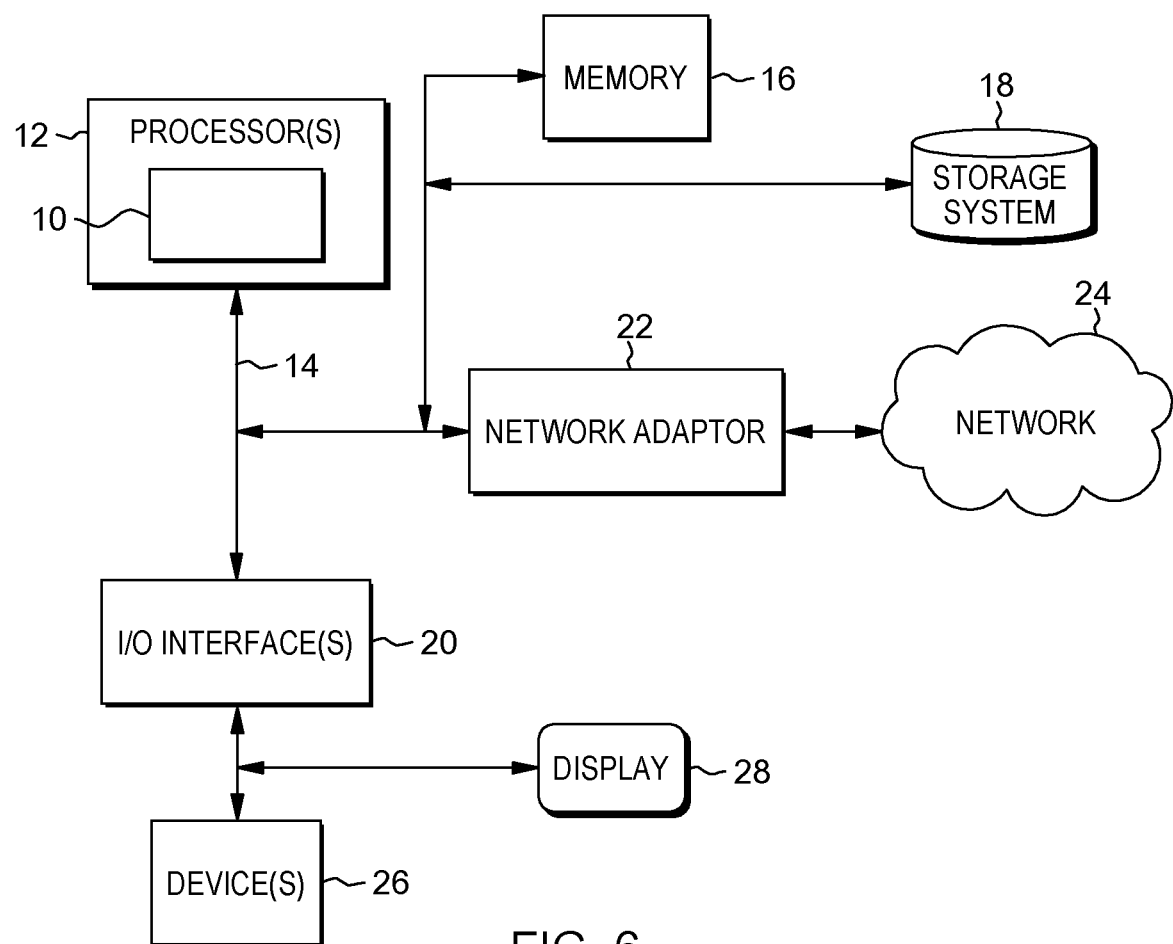
FIG. 6 is a block diagram of a computing system according to an exemplary embodiment of the present disclosure.

The methods of FIG. 4 are run at a computer system such as shown in FIG. 6 that is configured with three main components: (i) an encoding component that applies convolutional neural networks to induce the distributed representations for the input sequences $s_i$, $c_i$, $d_i$, $t_{ij}$, and $b_{ij}$ at 185 (ii) the local component that computes the local similarities $\phi_{local}(m_i, p_{ij})$ for each entity mention $m_i$ at 190; and (iii) the global component that runs recurrent neural networks on the entity mentions {$m_1, m_2, \ldots, m_k$} to generate the global features $\phi_{global}(m_1, m_2, \ldots, m_i, P_1, P_2, \ldots, P_i)$ at 195. Finally, at step 197, the method computes a final ranking score as the sum of the scores obtained at steps 190 and 195.

In particular, in the method 180, FIG. 4, at first step 185, there is obtained the distributed representations obtained by applying the CNN model 50 as depicted in FIG. 2 which representation is computed as vector 77 of FIG. 2. In particular, the encoding an entity mention m( ) is by extracting a word sequence from a document that includes the entity mention m( ). For each entity mention m( ) extracted, the method encodes by assigning a value to a variable x, where x is some context word sequence of the entity mentions or target candidates (i.e., $x \in \{s_i, c_i, d_i\}_i \cup \{t_{ij}, p_{ij}\}_{i,j} \cup \{t_i, b_i^*\}_i$). In order to obtain the distributed representation for x, each word $x_i \in x$ is first transformed into a real-valued, h-dimensional vector $w_i$ using a word embedding table E such as described in a reference to Mikolov, Tomas and Chen, Kai and Corrado, Greg and Dean, Jeffrey entitled *Efficient Estimation of Word Representations in*

*Vector Space*, ICLR, 2013. For example, the vectors $w_i=E[x_i]$ are generated. This converts the word sequence x into the sequence of vectors that is padded with zero vectors to form a fixed-length sequence of vectors $w=(w_1, w_2, \ldots, w_n)$ of length n.

In the next step 190, FIG. 4, the method applies the convolution neural network operations over the fixed-length sequence of vectors w to generate the hidden vector sequence 64a, 64b, . . . , 64n, that is then transformed by a non-linear function G and pooled by a sumfunction such as the function as described in a reference to Francis-Landau, Matthew and Durrett, Greg and Klein, Dan entitled *Capturing Semantic Similarity for Entity Linking with Convolutional Neural Networks*, NAACL, 2016.

In one embodiment, the method utilizes a set L of multiple window sizes to parameterize the convolution operation. Each window size $l \in L$ corresponds to a convolution matrix $M_l \in R^{v \times lh}$ of dimensionality v. Eventually, the concatenation vector $\bar{x}$ of the resulting vectors for each window size in L would be used as the distributed representation for x:

$$\bar{x} = \bigoplus_{l \in L} \sum_{i=1}^{n-l+1} G(M_l w_{i:(i+l-1)})$$

where $\oplus$ is the concatenation operation over the window set L and $w_{i:(i+l-1)}$ is the concatenation vector of the given word vectors. Thus, in one example implementation, the CNN models to learn the distributed representations for the inputs may use window sizes in a set $L=\{2, 3, 4, 5\}$ for the convolution operation with the dimensionality $v=200$ for each window size. The non-linear function for transformation is $G=\tan h$. As there is computed cosine similarities between the hidden vectors of the RNN models and the representation vectors of the target candidates, the number of hidden units for the RNN is set to $200|L|=800$ naturally.

For convenience, there is obtained vectors $\bar{s}_i, \bar{c}_i, \bar{d}_i, \bar{t}_{ij}, \bar{b}_{ij}, \bar{t}_i^*$ and $\bar{b}_i^*$ as the distributed representations of $s_i, c_i, d_i, t_{ij}, p_{ij}, t_i^*$ and $b_i^*$ respectively, obtained by the convolution procedure at the computer system. The method includes applying the same set of convolution parameters for each type of text granularity in the source document D as well as in the target entity side. The method then feeds the vector representations of the context into the local similarities component and global similarities component to compute the features for EL.

In one embodiment, for the method step depicted at step 210, FIG. 4 employed to compute the local similarities $\phi_{local}(m_i, p_{ij})$, the computer system employs a state-of-the-art neural network model for EL. In one embodiment, the model is implemented as:

$$\phi_{local}(m_i, p_{ij}) = \phi_{sparse}(m_i, p_{ij}) + \phi_{CNN}(m_i, p_{ij}) = W_{sparse} F_{sparse}(m_i, p_{ij}) + W_{CNN} F_{CNN}(m_i, p_{ij})$$

where $W_{sparse}$ and $W_{CNN}$ are the weights computed for the feature vectors $F_{sparse}$ and $F_{CNN}$ respectively. $F_{sparse}(m_i, p_{ij})$ is the sparse feature vector obtained in the manner such as described by Durrett, Greg and Klein, Dan in a reference entitled *A Joint Model for Entity Analysis: Coreference, Typing, and Linking*, TACL, 2014. This vector captures various linguistic properties and statistics that have been discovered for EL. In one embodiment, the representative features include the anchor text counts from Wikipedia, the string match indications with the title of the Wikipedia candidate pages, or the information about the shape of the queries for candidate generations. The variable, $F_{CNN}(m_i, p_{ij})$, on the other hand, involves generating the cosine similarities between the representation vectors at multiple granularities of $m_i$ and $p_{ij}$. In particular:

$$F_{CNN}(m_i, p_{ij}) = [\cos(\bar{s}_i, \bar{t}_{ij}), \cos(\bar{c}_i, \bar{t}_{ij}), \cos(\bar{d}_i, \bar{t}_{ij}), \cos(\bar{s}_i, \bar{b}_{ij}), \cos(\bar{c}_i, \bar{b}_{ij}), \cos(\bar{d}_i, \bar{b}_{ij})]$$

A basis for this computation is that the similarities at different levels of contexts may enforce the potential topic compatibility between the contexts of the entity mentions and target candidates for EL.

In one embodiment, the method employed then computes the global similarities $\phi_{global}(m_1, m_2, \ldots, m_i, P_1, P_2, \ldots, P_i)$ at step 215, FIG. 4. In order to encapsulate the coherence among the entity mentions and their target entities, there is performed the running of recurrent neural networks over the sequences of the representation vectors for the entity mentions (i.e, the vector sequences for the surface strings $(\bar{s}_1, \bar{s}_2, \ldots, \bar{s}_k)$ and for the immediate contexts $(\bar{c}_1, \bar{c}_2, \ldots, \bar{c}_k)$) and the target entities (i.e, the vector sequences for the page titles $(\bar{t}_1^*, \bar{t}_2^*, \ldots, \bar{t}_k^*)$ and for the body contents $(\bar{b}_1^*, \bar{b}_2^*, \ldots, \bar{b}_k^*)$). In one embodiment, there are different recurrent neural networks for different context vector sequences.

As an example, the representation vector sequence of the body contents of the target pages is $(\bar{b}_1^*, \bar{b}_2^*, \ldots, \bar{b}_k^*)$. In an embodiment, in the training process, $(\bar{b}_1^*, \bar{b}_2^*, \ldots, \bar{b}_k^*)$ are obtained from the "golden" target entities while in the test time, they are retrieved from the predicted target entities. In one embodiment, in order to train the whole model (or the iterative process), a "training dataset" is provided including entity mentions that have been associated with a correct target entity in the provided list of target entity candidates. Golden target entities amount to these provided correct target entities. The recurrent neural network with the recurrent function $\Phi$ for this sequence will generate the hidden vector sequence $(h_1^b, h_2^b, \ldots, h_k^b)$ where: $h_i^b = \Phi(h_{i-1}^b, \bar{b}_i^*)$.

In one embodiment, the whole network (or model, or iterative process) is trained for purposes of finding the optimal values for the parameters in the network. Training is done on the "training dataset. The model with the optimal parameters (obtained from training) is then used in the product. In one embodiment, the whole network is trained with the stochastic gradient descent algorithm using mini-batches. The gradients are computed using back-propagation.

Each vector $h_i^b$ in this sequence encodes or summarizes the information about the content of the previous target entities (i.e, before a current entity i) in the document due to the property of RNN.

Given the hidden vector sequence, when predicting the target entity for the entity mention $m_i$, it is ensured that the target entity is consistent with the global information stored in $h_{i-1}^b$. This is achieved by using the cosine similarities between $h_{i-1}^b$ and the representation vectors of each target candidate $p_{ij}$ of $m_i$, (i.e, $\cos(h_{i-1}^b, \bar{t}_{ij})$ and $\cos(h_{i-1}^b, \bar{b}_{ij})$) as the global features for the ranking score.

The process is repeated at 215, FIG. 4 for the other representation vector sequences in both the entity mention side and the target entity side. The method groups the resulting global features into a single feature vector to compute the global similarity score $\phi_{global}(m_1, m_2, \ldots, m_i, P_1, P_2, \ldots, P_i)$ as was done in computing the local similarity. Then the process returns to step 165, FIG. 3 to rank the target candidate entity (e.g., page).

With respect to entity linking performed at 170, FIG. 3, there is performed, in one embodiment, a forward linking because the entity mentions are disambiguated simultaneously from the beginning to the end of the documents. In backward linking, the entity mentions are also disambiguated simultaneously, but this time from the end to the beginning of the documents (i.e., in the reverse order). By combining "forward linking" and "backward linking", there is being targeted a variety of combination methods. In one embodiment, the method computes the scores from both "forward linking" and "backward linking" for each target candidates, and then combine these two scores (e.g., by addition). An example method that could be implemented is described in further detail below.

In one aspect, the methods herein exploit the recurrent neural networks' ability to adaptively compress variable length sequences of predictions for global constraints. That is, in applying the RNN, there is processed an input sequence of vectors (e.g., $x_1, x_2, \ldots, x_n$) and produce another sequence of vectors as output (e.g., $h_1, h_2, \ldots, h_n$, again each of them is a vector). Note that the input and output vector sequences have the same length. RNN produces the output sequence ($h_1, h_2, \ldots, h_n$) in a sequence order from left to right, i.e., generate $h_1$ first and then $h_2, h_3$ and so on to $h_n$. Now, at the step i ($1 \leq i \leq n$), his computed by the formula: $h_i = \Phi(x_i, h_{\{i-1\}})$. Thus, essentially $h_i$ is computed from the input at the current step $x_i$ and the output in the previous step $h_{\{i-1\}}\}$. This recurrent computation helps RNN to compress the input sequence because $h_i$ has the information about all the vectors in the input sequence in the previous step (i.e., from $x_1$ to $x_i$).

In one embodiment, compressing "adaptively" refers to not taking all the information of the previous input vectors (i.e., from $x_1$ to $x_i$) and put it into $h_i$. Rather, just a part of the information in each previous input vector is taken and these parts stored in $h_i$. Additionally, the amount of information desired to be kept in each previous input vector is dynamic, or to be dependent on a specific downstream task (e.g., in this case, entity linking). In order to achieve that, the special recurrent function for $\Phi$ in the recurrent computation. In the embodiments herein, the $\Phi$ function is used as the gated recurrent units.

Regarding the recurrent function $\Phi$, in one embodiment, there is employed the gated recurrent units (GRU) to alleviate the "vanishing gradient problem" of RNN. GRU is a simplified version of long-short term memory units (LSTM) that has been shown to achieve comparable performance.

In the RNNs to be implemented in one embodiment, at each time step (word position in sentence) i, there are three main vectors: the input vector $x_i \in R^I$, the hidden vector $h_i \in R^H$, and the output vector $o_i \in R^O$ (I, H and O are the dimensions of the input vectors, the dimension of the hidden vectors and the number of possible labels for each word respectively). The output vector $o_i$ is the probabilistic distribution over the possible labels for the word $x_i$ and obtained from $h_i$, e.g., via the softmax function:

$$o_i = \varphi(Wh_i); \varphi(z_m) = \frac{e^{z_m}}{\sum_k e^{z_k}}$$

Regarding the hidden vectors or units $h_i$, there is implemented a method to obtain them from the current input and the last hidden and output vectors. This RNN variant is referred to as the "Elman" model, wherein the hidden vector from the previous step $h_{i-1}$, along with the input in the current step $x_i$, constitute the inputs to compute the current hidden state $h_i$ according to equation 1) as follows:

$$h_i = \Phi(Ux_i + Vh_{i-1}) \quad (1)$$

where $\Phi$ is the sigmoid activation function:

$$\Phi(z) = \frac{1}{1 + e^{-z}}$$

and where W, U, and V are the same weight matrices for all time steps, to be learned during training. It is understood that there may alternatively be implemented the "Jordan" model (JORDAN), where the output vector from the previous step $o_{i-1}$ is fed into the current hidden layer rather than the hidden vector from the previous steps $h_{i-1}$. The rationale for this topology is to introduce the label from the preceding step as a feature for current prediction In one embodiment, the GRUs are incorporated into the ELMAN model (e.g., ELMAN_GRU), with methods to compute the hidden vectors $h_i$. The formula for ELMAN_GRU is adopted from a reference to Kyunghyun Cho et al. entitled *Quick introduction to natural language processing with neural networks*, Lecture at the Ecole Polytechnique de Montreal, 2014, and given according to equations (2) s follows:

$$h_i = z_i \odot \hat{h}_i + (1 - z_i) \odot h_{i-1}$$

$$\hat{h}_i = \Phi(W_h x_i + U_h(r_i \odot h_{i-1}))$$

$$z_i = \Phi(W_z x_i + U_z h_{i-1})$$

$$r_i = (W_r x_i + U_r h_{i-1}) \quad (2)$$

where $W_h, W_z, W_r \in R^{H \times I}$; $U_h, U_z, U_r \in R^{H \times H}$, and $\odot$ is the element-wise multiplication operation.

Finally, for training, the methods are invoked to jointly optimize the parameters for the CNNs, RNNs and weight vectors by maximizing the log-likelihood of a labeled training corpus. In one embodiment, a stochastic gradient descent algorithm is utilized and the AdaDelta update rule is used such as described in a reference to Zheng, Zhicheng and Li, Fangtao and Huang, Minlie and Zhu, Xiaoyan entitled *Learning to Link Entities with Knowledge Base NAACL*, 2010. The gradients are computed via back-propagation. In one embodiment, the word embedding table is not updated during training.

Figure 5:
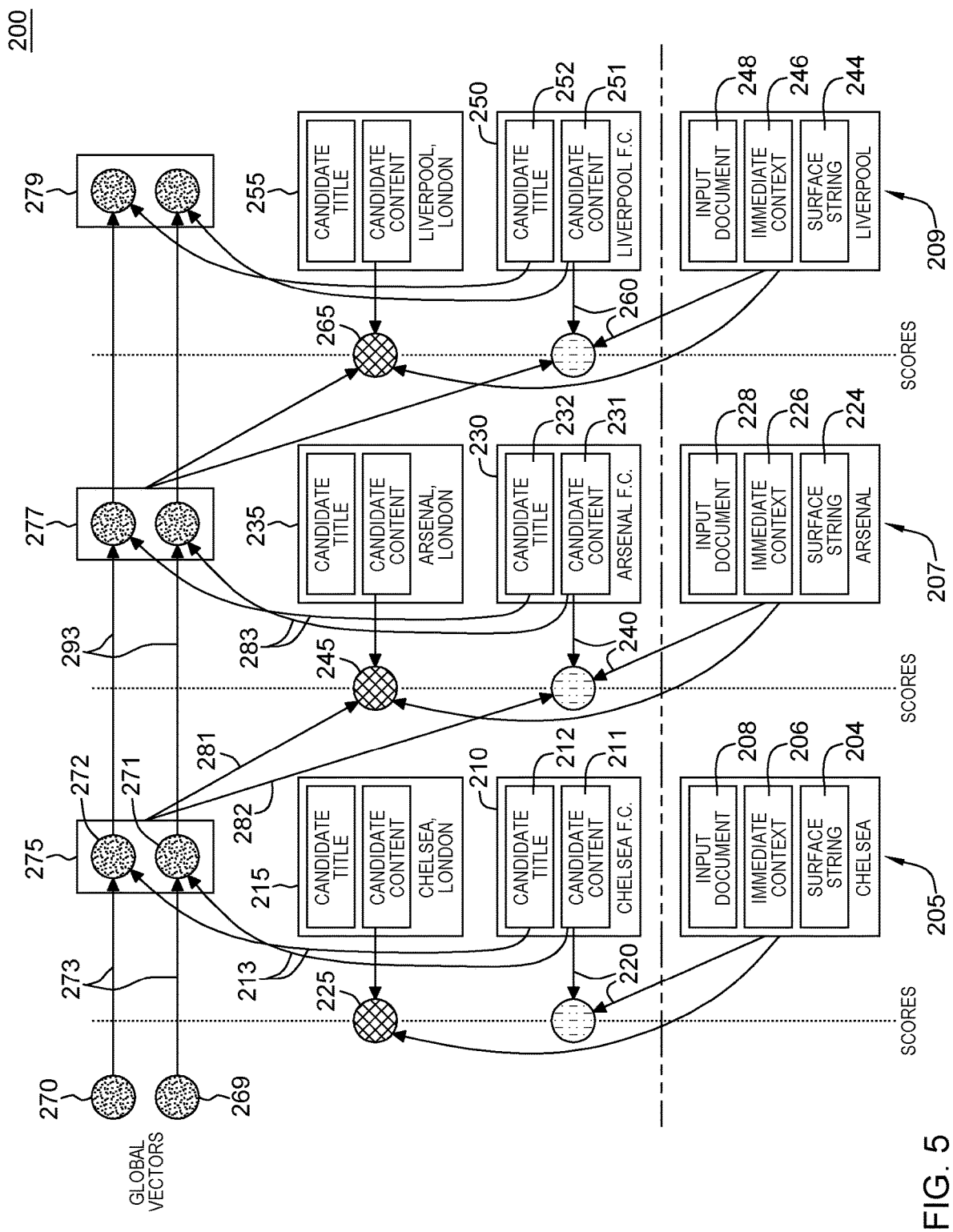
FIG. 5 shows a conceptual illustration of a joint model 200 for learning local and global features for a document with three example entity mentions depicted.

FIG. 5 shows an illustration of a joint model 200 for learning local and global features for a document with the distributed representations (vectors 77) obtained using the CNN model in FIG. 2 corresponding to the three entity mentions: Chelsea 205, Arsenal 207 and Liverpool 209, of the described example. In each of the three distributed representations 205, 207 and 209 there is associated a sequence of context data. For example, for entity mention Chelsea 205, the distributed representation includes a surface string context data 204, immediate context data 206 and an input document 208. There are additionally received corresponding two target entity candidate pages for example distributed representation of entity mention Chelsea 205, e.g., either a football club 210 or a city 215. In the embodiments shown, the target entity candidate 210 includes a candidate content vector 211 and candidate title data vector 212. Likewise, there is processed for the entity mention Arsenal 207, the distributed representation includes a surface string context data 224, immediate context data 226 and an input document 228, and additionally corresponding two target entity candidate pages, for example a football club 230 or a city 235. In the embodiments shown, the target entity candidate 230 includes a candidate content vector 231 and candidate title data vector 232. Additionally, there is processed for the distributed representation of entity mention Liverpool 209 a surface string context data 244, immediate context 246 and an input document 248, and additionally corresponding two target entity candidate pages, for example a football club 250 or a city 255. In the embodiments shown, the target entity candidate 250 includes a candidate content vector 251 and candidate title data vector 252. In the example processing depiction of FIG. 5, the data blocks 204, 206, 208, 211 and 212 denote the CNN-induced representation vectors $\bar{s}_i$, $\bar{c}_i$, $\bar{d}_i$, $\bar{b}_{ij}$ and $\bar{t}_{ij}$ corresponding to input sequence $s_i$, $c_i$, $b_{ij}$ and $t_{ij}$ for the distributed representation of entity mention Chelsea 205. Generally, as shown in FIG. 5, for each entity mention i, there is induced CNN-induced representation vectors $\bar{s}_i$, $\bar{c}_i$, $\bar{d}_i$, $\bar{t}_{ij}$ and $\bar{b}_{ij}$ corresponding to input sequence $s_i$, $c_i$, $d_i$, $t_{ij}$, and $b_{ij}$ for that entity mention i.

The circles 220 and 225 represent the respective ranking scores computed for the target entity candidates 210, 215. Likewise, the circles 240 and 245 represent the respective ranking scores computed for the respective target entity candidates 230, 235, and the circles 260 and 265 represent the respective ranking scores computed for the respective target entity candidates 250, 255. In the example, the circles 220, 240 and 260 correspond to the correct target entities.

As further shown in FIG. 5, the circles 270 and 271 represent the hidden vectors (i.e, the global vectors) of the RNNs running over the entity mentions. In FIG. 5, only pairs of the global entity vectors 275, 277, 279 are shown corresponding to respective global entities. That is, the global-entity type of global feature vectors 275, 277, 279 shown focuses on the target entity side and models the coherence with the representation vectors of the target entities (i.e, the page title vectors $(\bar{t}_1^*, \bar{t}_2^*, \ldots, \bar{t}_k^*)$ and the body content vectors $(\bar{b}_1^*, \bar{b}_2^*, \ldots, \bar{b}_k^*)$) There may alternatively, or in addition, be generated global vectors corresponding to the global mentions (vectors). The global mention type of global features vectors concerns the entity mention side and involves applying the global RNN models on the CNN-induced representation vectors of the entity mentions (i.e, the surface vectors $(\bar{s}_1, \bar{s}_2, \ldots, \bar{s}_k)$ and the immediate context vectors $(\bar{c}_1, \bar{c}_2, \ldots, \bar{c}_k)$).

In an example embodiment depicted in FIG. 5, five CNN models may be used to generate the vector values, e.g., at an entity mention three sequences for generating the three vectors (204, 206 and 208) for one entity mention, and two for generating the two vectors (211 and 212) corresponding to the sequence "Title" of the document page and "content" of the entity candidate document. Thus five vectors are generated for each candidate mention. In the example shown in FIG. 5, given these five vectors, for each entity mention, the RNN is run over the entity mentions, e.g., Chelsea (first), then Arsenal and then Liverpool. The circles 269, 270 are the hidden vectors, i.e., global vectors, and are generated via the RNN processing. In particular, hidden vectors 271, 272 are generated based on RNN candidate entity processing 213 of the vectors encapsulating candidate content 211 and candidate title 212 for the Chelsea F.C. target candidate entity 210. As shown in FIG. 5, the processing of the vectors 271, 272 includes implementing prior global vector results 273 from the global vectors 269, 270 obtained from a previous RNN run in addition to the current CNN vectors results, e.g., candidate title and candidate content vectors. This application of RNN is repeated for two times: once using vectors for the correct candidate 220 and for the incorrect candidate 225. This process is repeated for each of the distributed representations corresponding to entity mentions 205, 207 and 209.

It is noted that the content 281, 282 of respective of global vectors 271, 272 computed for entity mention 205 are utilized in the computing of scores of the next entity mention 207, e.g., for the correct candidate 240 and incorrect candidate 245.

Thus, with respect to the next entity mention processing for entity mention Arsenal 207, to compute the correct target candidate relevance score 240 and incorrect target candidate relevance score 245 for target candidate entity Arsenal F.C. 230, there is obtained from CNN processing computation of each relevance score based on the vectors of the semantics 224, 226 and 228 of the entity mention Arsenal 207 and based on the candidate content and title semantics captured in the vectors representing target candidate entity 230. Further, hidden vectors 277 are generated based on RNN candidate entity processing 283 of the vectors encapsulating candidate content 231 and candidate title 232 for the Arsenal F.C. target candidate entity 230. As shown in FIG. 5, the processing of the global vectors 277 additionally includes implementing prior global vector results 293 from the global vectors 271, 272 obtained from the RNN run of the previous entity mention Chelsea 205 in addition to the current CNN vectors results 283, e.g., candidate title and candidate content vectors. FIG. 5 depicts further CNN and RNN processing for the next entity mention 209 and using the results as from the previous entity mention 207 processing.

FIG. 6 illustrates a schematic of an example computer or processing system that may implement the method to disambiguate entity mentions in documents for entity linking in the embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the entity linking using CNN and RNN processes according to the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for disambiguating one or more entity mentions in one or more documents, comprising:
    receiving, at a at least one processor, a set of one or more entity mentions in a document and context data associated with each entity mention;
    receiving, at the at least one processor, a set of one or more target candidate entities that potentially refers to or describes the entity mentions in the document;
    running, by the at least one processor, convolutional neural network (CNN) models for identifying and learning local features associated with each entity mention and target candidate entity and associated context;
    running recurrent neural networks (RNN) model operations on the at least one processor over the identified local features of the entity mentions and target candidate entities of the document to capture a topical coherence between the entity mentions and the target candidate entities; and
    linking each entity mention to a respective the target candidates entity in the document based on the identified local features and the topical coherence from the convolutional neural networks and recurrent neural networks, said linking comprising
        computing, at the at least one processor, a relevance score for the target candidates using said CNN model operations;
        providing, by the at least one processor, a forward linking of the entity mentions to identified target candidates; and
        ranking a forward linking, based on the target candidate's relevance score; and
        providing, by the at least one processor, a backward linking of the entity mentions to identified target candidates using RNNs model operations, and
        ranking said backward linking based on the computed relevance score; and
        combining, at the at least one processor, forward linking ranks and backward linking ranks, to create a combined linking rank when training and applying the model operations.

2. The computer-implemented method of claim 1, further comprising:
    encoding multiple variables, each variable comprising a word sequence including an entity mention and associated context, or target candidates, or both the word sequence including an entity mention and associated context and target candidates;
    transforming each encoded variable into a corresponding encoded vector using a word embedding table; and
    said at least one processor running CNN model operations on said encoded vectors to obtain a distributed representation for the encoded vectors.

3. The computer-implemented method of claim 2, further comprising:
    utilizing a set of multiple window sizes to parameterize the CNN model operations on said encoded vectors, each window size corresponds to a convolution matrix of a predetermined dimensionality.

4. The computer-implemented method of claim 3, further comprising:
concatenating the resulting vectors for each window size for representation as the distributed representation for encoded variable as a single concatenation vector.

5. The computer-implemented method of claim 1, further comprising:
computing, using the local features from the CNN model operations, similarities between each entity mention and pages of said target candidate entities, said computing of local features learned using said entity mentions and pages comprising:
computing a first weight and a second weight for a respective feature vector and feature vector, where is a sparse feature vector capturing one or more linguistic properties and linking statistics, and where is generated using the cosine similarities between the encoded vectors at multiple granularities of entity mentions and pages of said target candidate entity.

6. The computer-implemented method of claim 1, further comprising:
receiving, at said at least one processor running said RNN model operations for a current entity mention, said distributed representations for the encoded vectors; and
using said RNN to accumulate information about a previous entity mention and target candidate entities, and providing them as the global constraints for the linking process of the current entity mention.

7. The computer-implemented method of claim 1, further comprising:
computing of the ranking scores for all the target candidates of all the entity mentions in each document simultaneously, while preserving the order of the entity mentions from the beginning to the end of an input document.

8. A computer system for disambiguating one or more entity mentions in one or more documents, comprising:
at least one processor;
a memory storing instructions to be run at said at least one processor; said instructions configuring said at least one processor to perform a method to
receive a set of one or more entity mentions in a document and context data associated with each entity mention;
receive a set of one or more target candidate entities that potentially refers to or describes the entity mentions in the document;
run convolutional neural network (CNN) models for identifying and learning local features associated with each entity mention and target candidate entity and associated context;
run recurrent neural networks (RNN) model operations over the identified local features of the entity mentions and target candidate entities of the document to capture a topical coherence between the entity mentions and the target candidate entities; and
link each entity mention to a respective the target candidates entity in the document based on the identified local features and the topical coherence from the convolutional neural networks and recurrent neural networks, wherein to link, said at least one processor is configured to:
compute a relevance score for the target candidates using said CNN model operations;
provide a forward linking of the entity mentions to identified target candidates; and
rank a forward linking, based on the target candidate's relevance score; and
provide a backward linking of the entity mentions to identified target candidates using RNNs model operations, and
rank said backward linking based on the computed relevance score; and
combine forward linking ranks and backward linking ranks, to create a combined linking rank when training and applying the model operations.

9. The computer system of claim 8, wherein said at least one processor is further configured to:
encode multiple variables, each variable comprising a word sequence including an entity mention and associated context, or target candidates, or both the word sequence including an entity mention and associated context and target candidates;
transform each encoded variable into a corresponding encoded vector using a word embedding table; and
run CNN model operations on said encoded vectors to obtain a distributed representation for the encoded vectors.

10. The computer system of claim 9, wherein said at least one processor is further configured to:
utilize a set of multiple window sizes to parameterize the CNN model operations on said encoded vectors, each window size corresponds to a convolution matrix of a predetermined dimensionality.

11. The computer system of claim 10, wherein said at least one processor is further configured to:
generate a concatenation vector of the resulting vectors for each window size for representation as the distributed representation for encoded variable.

12. The computer system of claim 9, wherein said at least one processor is further configured to:
receive said distributed representations for the encoded vectors;
use said RNN to accumulate information about a previous entity mention and target candidate entities, and providing them as the global constraints for the linking process of the current entity mention.

13. A computer program product for disambiguating one or more entity mentions in one or more documents, said computer program product comprising:
a computer-readable storage medium having computer readable program instructions embodied therewith, the computer readable program instructions executable by at least one processor to cause a computer to perform a computer-implemented method comprising:
receiving, at the at least one processor, a set of one or more entity mentions in a document and context data associated with each entity mention;
receiving, at the at least one processor, a set of one or more target candidate entities that potentially refers to or describes the entity mentions in the document;
running, by the at least one processor, convolutional neural network (CNN) models for identifying and learning local features associated with each entity mention and target candidate entity and associated context;
running recurrent neural networks (RNN) model operations on the at least one processor over the identified local features of the entity mentions and target candidate entities of the document to capture a topical coherence between the entity mentions and the target candidate entities; and
linking each entity mention to a respective the target candidates entity in the document based on the identified local features and the topical coherence from the convolutional neural networks and recurrent neural networks, said linking comprising computing a relevance score for the target candidates using said CNN model operations;

providing a forward linking of the entity mentions to identified target candidates; and ranking a forward linking, based on the target candidate's relevance score; and providing, by the at least one processor, a backward linking of the entity mentions to identified target candidates using RNNs model operations, ranking said backward linking based on the computed relevance score;

combining, at the at least one processor, forward linking ranks and backward linking ranks, to create a combined linking rank when training and applying the model operations.

14. The computer program product of claim 13, wherein said computer readable program instructions configure said at least one processor to cause a computer to further perform a method comprising:

encoding multiple variables, each variable comprising a word sequence including an entity mention and associated context, or target candidates, or both the word sequence including an entity mention and associated context and target candidates;

transforming each encoded variable into a corresponding encoded vector using a word embedding table; and said at least one processor running CNN model operations on said encoded vectors to obtain a distributed representation for the encoded vectors.

15. The computer program product of claim 14, wherein said computer readable program instructions configure said at least one processor to cause a computer to further perform a method comprising:

utilizing a set of multiple window sizes to parameterize the CNN model operations on said encoded vectors, each window size corresponds to a convolution matrix of a predetermined dimensionality; and concatenating the resulting vectors for each window size for representation as the distributed representation for encoded variable as a single concatenation vector.

16. The computer program product of claim 14, wherein said computer readable program instructions configure said at least one processor to cause a computer to further perform a method comprising:

receiving said distributed representations for the encoded vectors;

using said RNN to accumulate information about a previous entity mention and target candidate entities, and providing them as the global constraints for the linking process of the current entity mention.

* * * * *